July 4, 1961 H. H. MANNING 2,990,735
WIRE CUTTING PLIERS WITH WIRE STRIPPING NOTCHES
Filed Jan. 21, 1959

INVENTOR.
Howard H. Manning
BY Ralph Hammar
attorney

United States Patent Office 2,990,735
Patented July 4, 1961

2,990,735
WIRE CUTTING PLIERS WITH WIRE STRIPPING NOTCHES
Howard H. Manning, Meadville, Pa., assignor to Champion De Arment Tool Company, Meadville, Pa., a corporation of Pennsylvania
Filed Jan. 21, 1959, Ser. No. 788,224
1 Claim. (Cl. 81—9.5)

This invention relates to wire cutting pliers such as used by electronic servicemen. The pliers include a wire stripping section which cuts through the insulation and avoids injury to the wire which would take place if the insulation were merely crushed.

Figure 1:
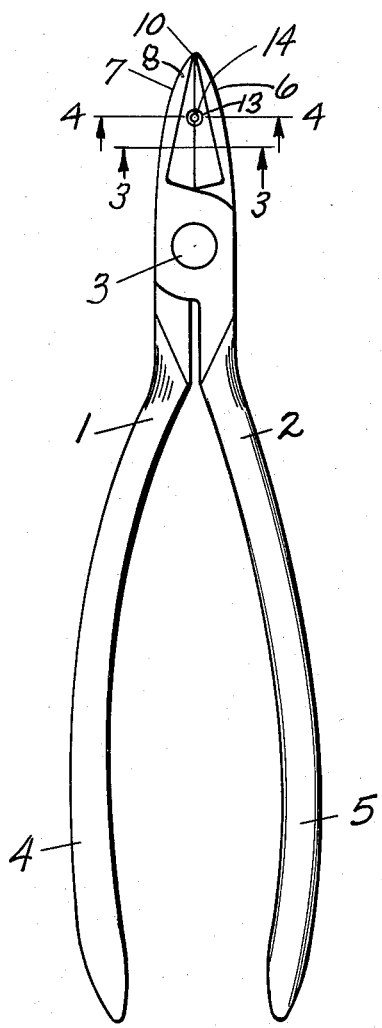
Figure 2:
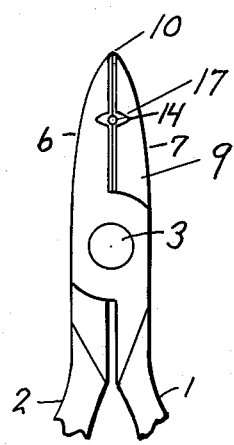
Figure 6:
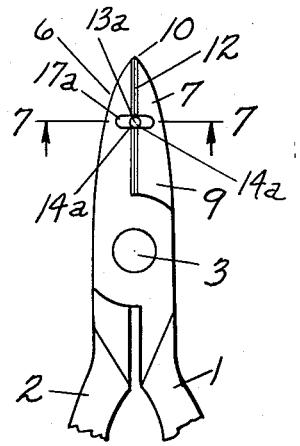
Figure 3:
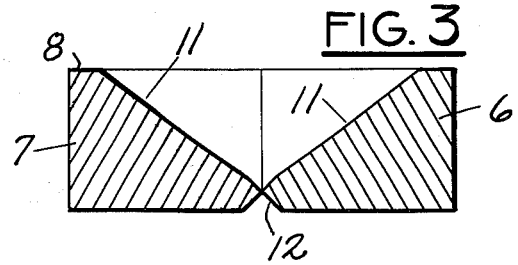
Figure 4:
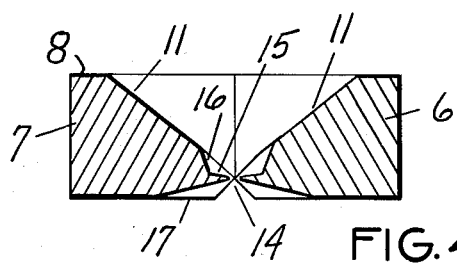
Figure 5:
Figure 5:

In the drawing, FIG. 1 is a top plan of the pliers; FIG. 2 is a bottom plan; FIG. 3 is a transverse section on line 3—3 of FIG. 1; FIG. 4 is a transverse section on line 4—4 of FIG. 1; FIG. 5 is an edge view; FIG. 6 is a bottom plan of a modification; and FIG. 7 is a section on line 7—7 of FIG. 6.

The pliers have crossed members 1 and 2 pivoted by a rivet 3 with handles 4 and 5 at one end and jaws 6 and 7 at the opposite end. In edge view the jaws have a substantially horizontal surface 8 at the top and an upwardly inclined bottom surface 9. The sides of the jaw converge to a pointed nose 10. The jaws are of generally triangular transverse cross section with inclined surfaces 11 converging downward to and intersecting upwardly inclined surfaces 12 at the bottom of the jaws and thereby defining pointed cutting edges. The parts so far described are or may be of common construction and are useful in cutting wires in the confined spaces encountered in radio chassis and the like.

For stripping the relatively fine wire used in electronic circuits, mating semi-circular notches 13 are provided in the cutting edges which in the closed position define a hole 14 in which the wire has a sliding fit. If the notches were provided by merely drilling a hole in the closed position of the jaws, the hole would have a bore of appreciable depth which would engage and crush the insulation coating on the wire. While this might be acceptable in wire of large size such as used for power, it is not acceptable in the fine wire used in electronic circuits where the crushing forces may cause kinks resulting in subsequent breakage. This disadvantage is overcome by bevelling the sides of the hole to provide pointed semi-circular cutting edges 15. On the upper side of the jaws the bevelling is conveniently made with a conical countersink providing the semi-circular bevelled or conical surfaces 16. On the lower side of the jaws, the bevelling can be made with a milling cutter which cuts a groove 17 centered on the hole 14 and crosswise of the cutting edges 12. Even if the semi-circular cutting edges 15 are not as sharp as the cutting edges 12, they are still adequate to cut through the insulation without injuring the wire.

Figure 7:
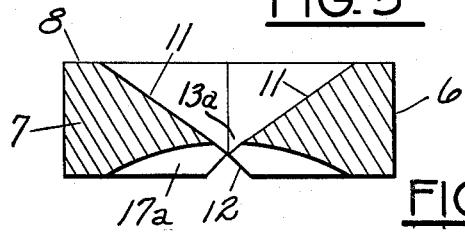

In FIGS. 6 and 7, the jaws of the pliers are of the same shape as the previously described construction and corresponding parts are indicated by the same reference numerals. When the pliers are closed, mating semi-circular notches 13a define a hole 14a in which the wire to be stripped has a sliding fit. These notches 13a have sharp cutting edges which cut through the insulation and do not exert a crushing force which might nick the wire. The cutting edges 13a are formed by an elongated transverse groove 17a which can be cut by a milling cutter having a shape intersecting the inclined surfaces 11 substantially in the form of a semi-circle. As will be noted in FIG. 7, at the points diametrically opposite a wire being stripped, the insulation cutting edges at the bottom of the notches 13a are spaced slightly above the plane of the wire cutting edges 12 and that the insulation cutting edges at the sides of the notches 13a merge into the cutting edges 12. It is important that the insulation cutting edges at the bottom of the notches 13a be sharp because these are directly opposite the wire being stripped and if these edges were not sharp the crushing forces exerted on the insulation could nick the wire. At the sides of the notches 13a it is not as important that the insulation cutting edges be as sharp because they are situated at either side of the wire and even if the edges were quite flat or blunt the crushing forces would be confined primarily to the insulation and would not nick the wire.

Forming the notches 13a by a single transverse groove 17a eliminates the expense of a countersinking operation and retains the advantages of sharp insulation cutting edges which prevent injury to the wire being stripped.

In both pliers wire being stripped is slidably received in holes formed by mating notches with edges which cut the insulation and do not crush the insulation against the wire being stripped.

What is claimed as new is:

Wire cutting and stripping pliers having a pair of pivoted crossed members, each member having a handle at one end and a jaw at the other end, the jaws being of generally triangular transverse cross section throughout their length with the apexes of the triangles presented toward each other, the lower surfaces of the jaws being generally horizontal with upwardly inclined longitudinally extending surfaces at the apexes of the triangles and the upper surfaces of the jaws sloping downwardly toward each other and intersecting said upwardly inclined surfaces and providing longitudinally extending mating cutting edges, and said jaws having an elongated transverse groove on the lower surfaces, said groove being curved in a direction transverse thereof and of concave shape in a direction lengthwise thereof and intersecting the downwardly inclined upper surfaces of the jaws above the cutting edges to provide mating semi-circular notches which when the jaws are closed define a hole having a sliding fit on wire to be stripped and also to provide sharp cutting edges at the bottoms of the notches for cutting through insulation on the wire to be stripped.

References Cited in the file of this patent

UNITED STATES PATENTS

| | | |
|---|---|---|
| 1,022,679 | Huston | Apr. 9, 1912 |
| 1,131,473 | Courtney | Mar. 9, 1915 |
| 1,257,948 | Aaron | Feb. 26, 1918 |
| 1,388,398 | Adams | Aug. 23, 1921 |
| 2,386,328 | Rollings | Oct. 9, 1945 |
| 2,585,080 | Beaulieu et al. | Feb. 12, 1952 |